(12) United States Patent
Veilleux, Jr. et al.

(10) Patent No.: US 10,663,041 B2
(45) Date of Patent: May 26, 2020

(54) JAM-TOLERANT ELECTRIC LINEAR ACTUATOR

(71) Applicant: HAMILTON SUNDSTRAND CORPORATION, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 90 days.

(21) Appl. No.: 16/103,272

(22) Filed: Aug. 14, 2018

(65) Prior Publication Data

US 2020/0056686 A1 Feb. 20, 2020

(51) Int. Cl.
*F16H 25/20* (2006.01)
*B64C 25/20* (2006.01)
(Continued)

(52) U.S. Cl.
CPC ....... *F16H 25/205* (2013.01); *F16H 25/2204* (2013.01); *B64C 25/20* (2013.01); *B64C 25/24* (2013.01)

(58) Field of Classification Search
CPC .. H02K 5/00; H02K 5/26; H02K 7/06; H02K 7/063; H02K 7/116; H02K 7/12; H02K 16/00; H02K 16/02; H02K 2205/00; H02K 2213/06; F16H 25/205; F16H 25/2204; B64C 25/20; B64C 25/24; B64C 13/28;
(Continued)

(56) References Cited

U.S. PATENT DOCUMENTS

| 3,407,680 A | * | 10/1968 | Westmoreland | ......... B60K 1/00 74/89.3 |
| 4,521,707 A | * | 6/1985 | Baker | ..................... F16H 25/20 310/112 |

(Continued)

FOREIGN PATENT DOCUMENTS

| EP | 1863154 A2 | 12/2007 |
| WO | 2008112363 A3 | 9/2008 |

OTHER PUBLICATIONS

Extended European Search Resport for European Application No. 19190759.1; Date of Completion: Dec. 17, 2019; dated Jan. 7, 2020; 8 Pages.

*Primary Examiner* — Burton S Mullins
(74) *Attorney, Agent, or Firm* — Cantor Colburn LLP

(57) ABSTRACT

A jam-tolerant electromechanical linear actuator having a contra-rotating axial flux permanent magnet (PM) motor having a first and second rotor shafts in a motor housing. The actuator also includes a first speed reduction mechanism operably coupled to the first rotor shaft and a second speed reduction mechanism operably coupled to the second rotor shaft; a first output shaft operably coupled to a output of the first speed reduction mechanism and a second output shaft operably coupled to an output of the second speed reduction mechanism. The actuator also includes a housing enclosing the PM motor, first speed reduction mechanism and second speed reduction mechanism and a slide mechanism operably coupled to the housing. The slide mechanism permit the housing to slide when the motor housing is fixed to the housing or the motor housing to slide with respect to the housing when the housing is held fixed.

19 Claims, 4 Drawing Sheets

(51) Int. Cl.
  *H02K 7/06* (2006.01)
  *H02K 16/02* (2006.01)
  *F16H 25/22* (2006.01)
  *B64C 25/24* (2006.01)

(58) Field of Classification Search
  CPC ....... B64C 13/50; B64C 13/504; B64C 13/34; B64C 13/38
  USPC ........................................................ 244/99.9
  See application file for complete search history.

(56) References Cited

U.S. PATENT DOCUMENTS

| | | | |
|---|---|---|---|
| 4,607,180 A * | 8/1986 | Stoody | F16H 25/2018 310/112 |
| 4,745,815 A | 5/1988 | Klopfenstein | |
| 4,856,379 A | 8/1989 | Jararey | |
| 4,876,906 A | 10/1989 | Jones | |
| 5,099,161 A | 3/1992 | Wolfbauer, III | |
| 5,144,851 A | 9/1992 | Grimm et al. | |
| 5,518,466 A * | 5/1996 | Tiedeman | F16H 35/10 475/342 |
| 5,649,451 A * | 7/1997 | Ruland | B23Q 1/4828 74/89.3 |
| 6,028,384 A | 2/2000 | Billman et al. | |
| 6,791,215 B2 * | 9/2004 | Tesar | F16H 25/205 310/12.24 |
| 6,802,475 B2 | 10/2004 | Davies et al. | |
| 6,981,428 B2 | 1/2006 | Donald et al. | |
| 7,190,096 B2 * | 3/2007 | Blanding | B64C 13/00 310/112 |
| 7,259,492 B2 * | 8/2007 | Yang | H02K 7/06 310/209 |
| 8,109,165 B2 | 2/2012 | Himmelmann | |
| 8,267,350 B2 * | 9/2012 | Elliott | F16H 25/205 244/99.2 |
| 8,390,160 B2 | 3/2013 | Gieras et al. | |
| 9,190,942 B2 | 11/2015 | Polcuch | |
| 9,685,838 B2 * | 6/2017 | Ueyama | F16H 25/205 |
| 9,797,490 B2 * | 10/2017 | Marvin | F16H 25/205 |
| 9,845,853 B2 | 12/2017 | Chamorro Gonzalez-Tablas et al. | |
| 2009/0072083 A1 * | 3/2009 | Hanlon | H02K 16/00 244/87 |

\* cited by examiner

JAM-TOLERANT ELECTRIC LINEAR ACTUATOR

BACKGROUND

Exemplary embodiments pertain to the art of actuators, more specifically jam-tolerant electro-mechanical linear actuator for application in aircraft.

Linear electromechanical actuators have been incorporated in aircraft over past years to operate critical flight elements, such as flight control surfaces and landing gear, while reducing fuel consumption due to the weight reduction obtained through the substitution of hydraulic and pneumatic systems for these lighter systems. Conventional linear electromechanical actuators with rotary induction motors have commonly been employed for flap and slat control of aircraft wing surfaces. Although, these linear electromechanical actuators can provide a convenient method of control, their lower force density, because the weight and volume, limits their applicability and scalability in airborne applications.

Conventional direct-drive linear permanent magnet (PM) motors produce force densities that are adequate for actuating various parts/loads onboard aircraft. On the other hand, modern linear actuators with ball screws or roller screws and rotary brushless DC PM motors produce much higher force density than conventional motors. Thus, for aircraft/engine architectures, ball screw or roller screw linear actuators with rotary PM brushless motors may prove advantageous because they can develop much higher thrust/torque for the same mass and volume envelope of conventional configuration. Moreover the greater force densities facilitate lower weight, and envelope capabilities. Potential applications for linear actuators in aircraft technology include, but are not limited to; flight control (both primary and secondary) surfaces; fuel systems management; lubrication systems management; aircraft equipment and environmental control systems.

Critical flight elements typically mount redundant linear electromechanical actuators to ensure their operability upon electrical or mechanical failure of one of the linear electromechanical actuators. To this end, the failed linear electromechanical actuator must freely extend and follow the movement of the working linear electromechanical actuator that continues to operate the critical flight element. Different solutions aimed at preventing failure of critical flight elements upon electrical or mechanical failure of one of the linear electromechanical actuators have been developed. A first solution consists of a linear electromechanical actuator with a screw-nut assembly engaged by means of a clutch to a gearbox driven by an electrical motor. Upon electrical or mechanical failure of the linear electromechanical actuator, actuation of the clutch disengages the screw-nut assembly from the gearbox, thus allowing free extension of the linear electromechanical actuator. Unfortunately, this solution does not prevent screw jamming, the main mechanical cause of failure of linear electromechanical actuators, as the disengagement occurs upstream of the screw-nut assembly.

Another solution consists of a pyrotechnic linear electromechanical actuator with a screw-nut assembly driven by an electric motor and a fuse-type piston engaged to the screw-nut assembly by retaining elements. Upon electrical or mechanical failure of the linear electromechanical actuator, explosive loads adjacent to the retaining elements are activated to destroy the retaining elements, which, in turn allows free extension of the linear electromechanical actuator. Any kind of electrical or mechanical failure will result in permanent disengagement of the fuse-type piston as the retaining elements have been destroyed. Therefore, the linear electromechanical actuator must be entirely mounted anew on the flight element after electrical or mechanical failure, increasing diagnostic and repair costs. Moreover, such systems, because of their destructive nature, are difficult to conduct thorough functional tests before installation.

BRIEF DESCRIPTION

Disclosed is a jam-tolerant electromechanical linear actuator having a contra-rotating axial flux permanent magnet (PM) motor having a first and second rotor shafts in a motor housing. The actuator also includes a first speed reduction mechanism operably coupled to the first rotor shaft and a second speed reduction mechanism operably coupled to the second rotor shaft; a first output shaft operably coupled to an output of the first speed reduction mechanism and a second output shaft operably coupled to an output of the second speed reduction mechanism. The actuator also includes a housing enclosing the PM motor, the first speed reduction mechanism and the second speed reduction mechanism and a slide mechanism operably coupled to the housing. The slide mechanism permits the housing to slide when the motor housing is fixed to the housing or the motor housing to slide with respect to the housing when the housing is held fixed.

In addition to one or more of the features described above or below, or as an alternative, further embodiments could include that the first output shaft and a second output shaft, radially and axially fixed by bearings in the housing.

In addition to one or more of the features described above or below, or as an alternative, further embodiments could include a first screw mechanism operably connected to the first output shaft and a second screw mechanism operably connected to the second output shaft.

In addition to one or more of the features described above or below, or as an alternative, further embodiments could include that the least one of the first screw mechanism or the second screw mechanism comprises at least one of a jack screw, a ball screw, and a roller screw.

In addition to one or more of the features described above or below, or as an alternative, further embodiments could include a first nut and first clevis and a second nut and second clevis, the first nut and first clevis operably connected to the first screw mechanism and the second nut and second clevis operably connected to the second screw mechanism.

In addition to one or more of the features described above or below, or as an alternative, further embodiments could include that at least one of the housing, and at least one of the first nut and first clevis and the second nut and second clevis are fixed and the other of the at least one of the first nut and first clevis and the second nut and second clevis are operably connected to a load.

In addition to one or more of the features described above or below, or as an alternative, further embodiments could include that at the first nut and first screw mechanism and the second nut and second screw mechanism at least one of, are concentric, rotate at different speeds, and rotate in opposite directions.

In addition to one or more of the features described above or below, or as an alternative, further embodiments could include that at least one of the housing, and at least one of the first output shaft and the second output shaft are fixed and the other of the at least one of the first output shaft and the second output shaft is operably connected to a load.

In addition to one or more of the features described above or below, or as an alternative, further embodiments could include that at least two of the first rotor assembly, second rotor assembly first output shaft, second output shaft, first speed reduction mechanism and second speed reduction mechanism are at least one of, are concentric, rotate at different speeds, and rotate.

In addition to one or more of the features described above or below, or as an alternative, further embodiments could include that the slide mechanism is fixed to frame and operably coupled to the housing when the motor housing is fixed to the housing and the slide mechanism fixed to the housing when the and the motor housing when the motor housing is not fixed to the housing.

In addition to one or more of the features described above or below, or as an alternative, further embodiments could include that the slide mechanism is configured to permit movement axially but not rotationally.

In addition to one or more of the features described above or below, or as an alternative, further embodiments could include that the stator assembly comprises a ferromagnetic stator core and a plurality of polyphase stator windings.

In addition to one or more of the features described above or below, or as an alternative, further embodiments could include that the ferromagnetic stator core is common to each winding of the plurality of polyphase stator windings.

In addition to one or more of the features described above or below, or as an alternative, further embodiments could include that each of the first rotor assembly and second rotor assembly further comprises a disk-shaped ferromagnetic rotor core having a side proximal to the stator assembly and a side distal from the stator assembly, each rotor core having a plurality of PMs disposed circumferentially about an outer periphery on the proximal side.

In addition to one or more of the features described above or below, or as an alternative, further embodiments could include that the ferromagnetic rotor core comprises at least one of a laminated ferromagnetic alloy construction, a sintered magnetic powder construction, a solid steel structure, and a ferromagnetic stamping.

In addition to one or more of the features described above or below, or as an alternative, further embodiments could include that the permanent magnets at least one of rectangular and trapezoidal and arcuate segments having two longer sides arranged substantially radially on the rotor core.

In addition to one or more of the features described above or below, or as an alternative, further embodiments could include that the first input and a first output of the first speed reduction mechanism and the second input and a second output, a second speed reduction mechanism having the first speed reduction mechanism operably coupled to the first rotor shaft and the second speed reduction mechanism operable coupled to the second rotor shaft.

In addition to one or more of the features described above or below, or as an alternative, further embodiments could include that the first speed reduction mechanism and the second speed reduction mechanism are each planetary gear sets.

Also described herein in an embodiment is a jam-tolerant electromechanical linear actuator. The jam-tolerant actuator includes an axial flux permanent magnet (PM) motor having a motor housing and a multipole stator assembly fixed in the motor housing, the motor also including a first rotor assembly and a second rotor assembly, the first rotor assembly having a first rotating shaft and the second rotor assembly having a second rotating shaft, the first rotating shaft and the second rotating shaft radially and axially fixed by bearings in the motor housing. The jam-tolerant actuator also includes a first speed reduction mechanism having a first input and a first output and a second speed reduction mechanism having a second input and a second output, where the first speed reduction mechanism operably coupled to the first rotor shaft and the second speed reduction mechanism operable coupled to the second rotor shaft, and a first output shaft and a second output shaft, the first output shaft operably coupled to the output of the first speed reduction mechanism and the second output shaft operably coupled to the output of the second speed reduction mechanism. The jam-tolerant actuator also includes a first screw mechanism operably connected to the first output shaft and a second screw mechanism operably connected to the second output shaft, as well as a first nut and first clevis and a second nut and second clevis, the first nut and first clevis operably connected to the first screw mechanism and the second nut and second clevis operably connected to the second screw mechanism. The jam-tolerant actuator further includes a housing, enclosing the PM motor, first speed reduction mechanism and second speed reduction mechanism, the housing including a first bearing to support the first output shaft at least radially, and a second bearing to support the second output shaft at least radially and axially, and a slide mechanism operably coupled to the housing, the slide mechanism configured to at least one of permit the housing to slide in an axial direction when the motor housing is fixed to the housing and permit the motor housing to slide in a axial direction with respect to the housing when the housing is held fixed. At least one of the housing, and at least one of the first nut and first clevis and the second nut and second clevis are fixed and the other of the at least one of the first nut and first clevis and the second nut and second clevis is operably connected to a load.

Other aspects, features, and techniques of embodiments will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. Described herein in one or more embodiment is a compact linear electromechanical actuator with a contra-rotating electric motor and reduction planetary gear sets structured to provide jam-tolerant full stroke operation. While the described embodiments are made with respect to an actuator for aircraft flap and slat actuation, such description is merely illustrative. It should be appreciated that the embodiments described herein may readily be applied to any application where jam-tolerant actuation is desired.

Figure 1:
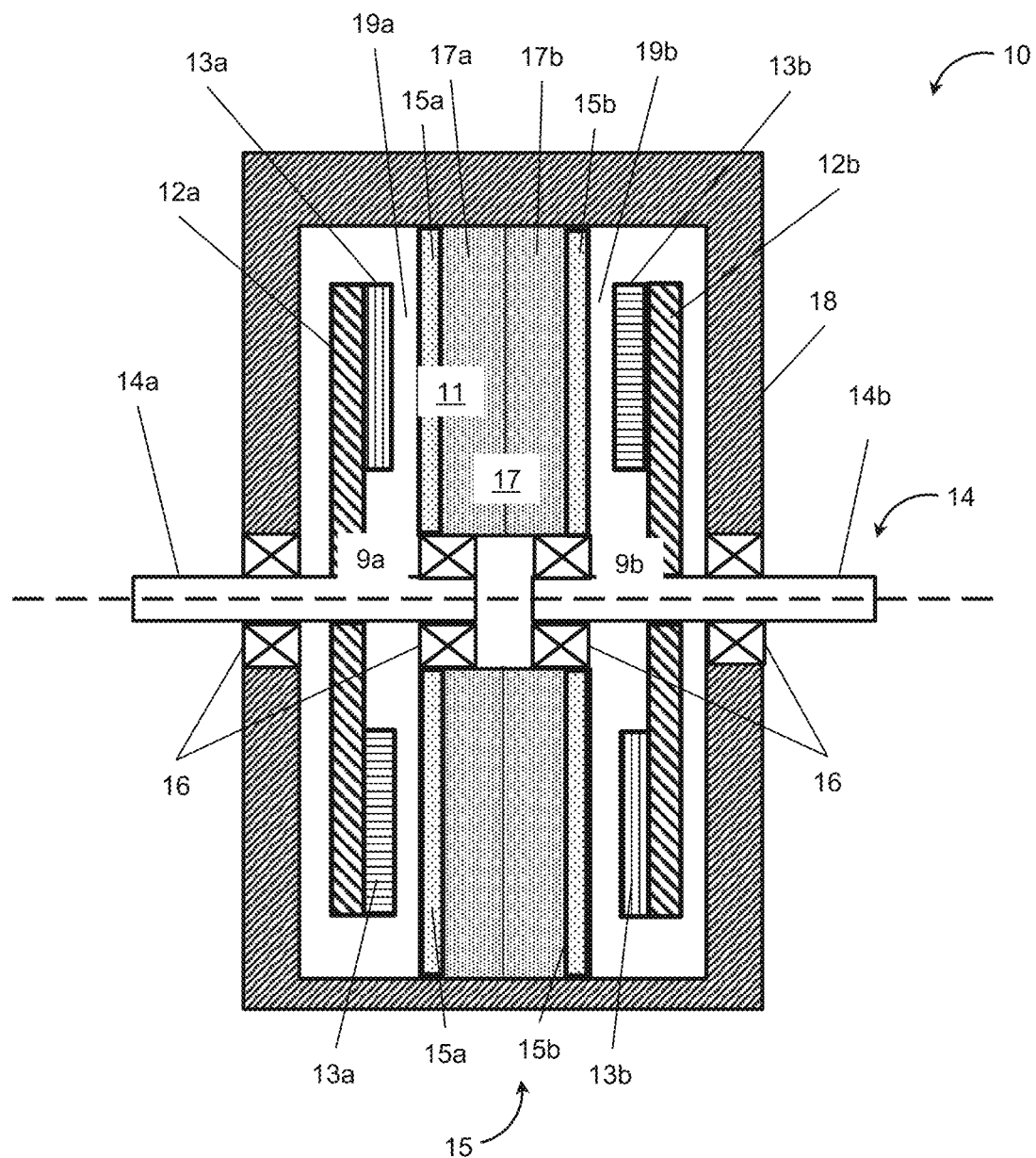
FIG. 1 depicts an axial-flux contra-rotating PM brushless motor in accordance with an embodiment.

FIG. 1 depicts a cut through view of an axial-flux pancake style PM brushless motor 10 in accordance with an embodiment. In a further embodiment the motor 10 is contra-rotating. A multiple pole stator assembly shown generally as 11, typically of the multiphase alternating current (AC) type, is described. The stator assembly 11 has armature windings 15a and 15b each wound on and coupled to a ferromagnetic stator core denoted 17. In an embodiment, the core I 17 is common to both stator windings 15a and 15b. In another embodiment two split cores denoted 17a and 17b are employed. With armature winding 15a coupled to core 17a and armature 15b coupled to core 15b. The stator assembly 11 has two independent windings shown generally as 15: one winding 15a (left) is for a rotor assembly denoted as 9a and the second winding 15b (right) is for the rotor assembly denoted 9b. Both stator windings 15a, 15b are polyphase windings, usually three-phase windings and excited via power electronics converters (not shown). However, it should be understood that any number of phases can be designed and employed. Both windings 15a, 15b produce rotating magnetic fields in the opposite (or in the same) direction depending on the method of control of windings 15a, 15b and applications. The minimum number of phases is one.

In an embodiment, the ferromagnetic stator core 17 may be constructed of any variety of ferromagnetic materials including, but not limited to steel laminations, sintered magnetic powder material, or solid ferromagnetic material such as steel. In one embodiment steel laminations are employed.

Continuing with FIG. 1, the two PM rotor assemblies 9a and 9b having disk shaped rotor cores 12a and 12b mounted on a first rotor shaft 14a (left) and a second rotor shaft 14b (right). That is, right side of the rotor core 12a for rotor assembly 9a and left side for the rotor core 12b and rotor assembly 9b. Disposed on the rotor cores 12a and 12b are multiple PMs 13a, and 13b respectively arranged and mounted circumferentially about its outer periphery. PMs 13a are disposed on the rotor 12a in close proximity to the stator winding 15a, while the permanent magnets 13b are disposed on the rotor 12b in close proximity to the stator winding 15b. In embodiment, a small left air gap 19a exists between the winding 15a and the PMs 13a, and a small right air gap 19b exists between the winding 15b and the PMs 13b.

PMs 13a and 13b are arranged and distributed about a circumference of in radial direction and magnetized axially, that is, the PMs 13a, 13b are trapezoidal or rectangular in shape, having two longer sides in radial direction and two shorter sides in the circumferential direction. In addition, the polarity of PMs 13a, 13b, i.e., magnetization vector, is in the axial direction. The ferromagnetic rotor cores 12a, 12b may be constructed of any variety of ferromagnetic materials including, but not limited to steel laminations, stampings, sintered magnetic powder material, or solid ferromagnetic material such as steel. In one embodiment steel laminations are employed. In another, the rotor assembly is machined from a steel block. The PMs 13a, 13b can also be arranged at an angle, offset, with respect to the rotor radius or can have different cross section than rectangular, e.g., arcuate annular segments. The number of PMs 13a, 13b is typically even to create pole pairs. The minimum number of PMs 13a, 13b is two for each rotor assembly 9a, 9b and the maximum number depends on the room available and the size of the PMs 13a, 13b. Rotor shafts shown generally as 14 and more specifically as shaft 14a (left) and shaft 14b (right) are independent and can spin on bearings 16, with the same speed or different speeds, either in the same, or in opposite directions within the motor housing 18. Motor housing 18 can be made of lightweight/strong/durable composite material(s) for additional weight savings.

Figure 2:
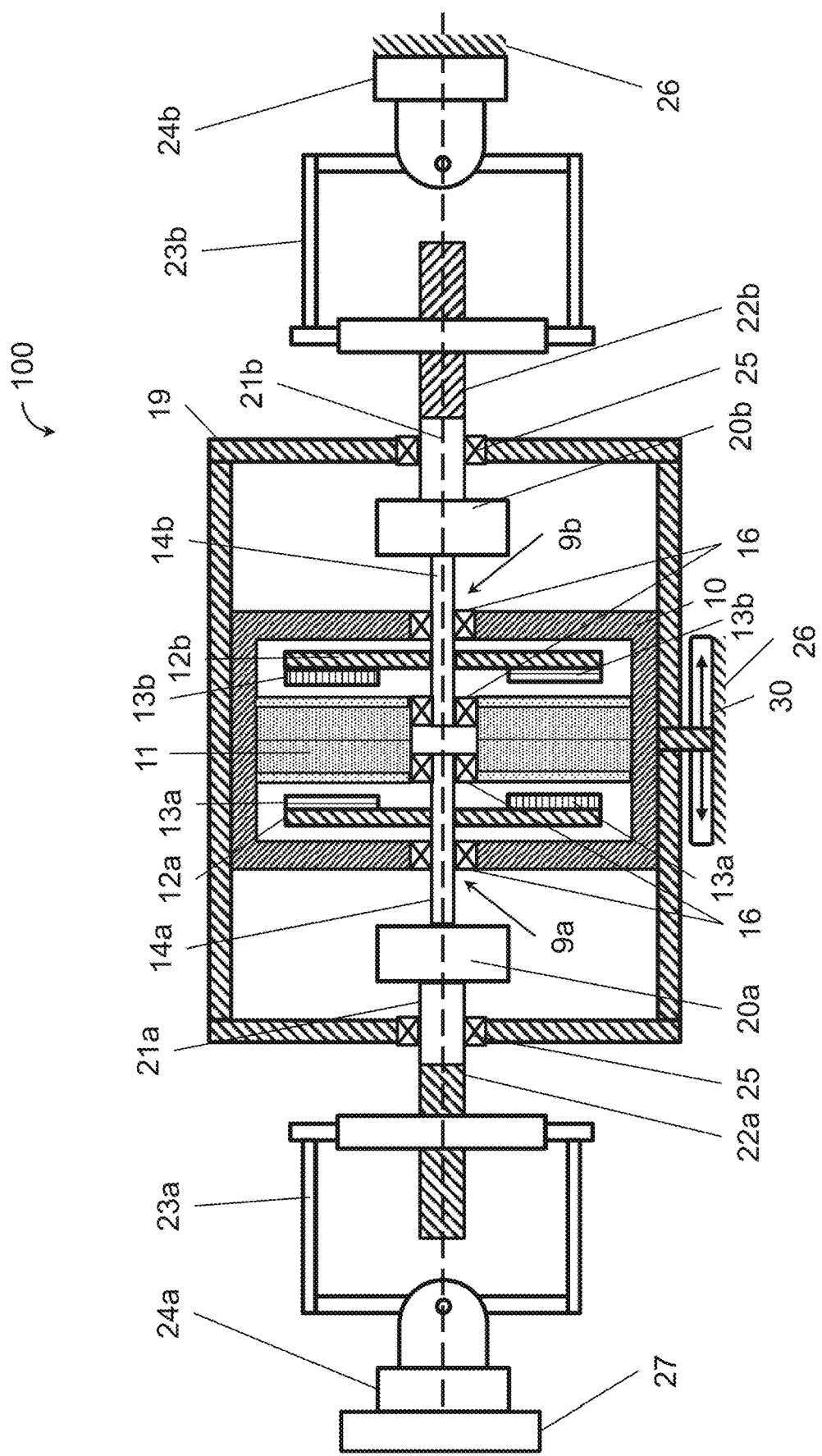
FIG. 2 depicts a simplified schematic of an electromagnetic linear actuator with contra-rotating axial-flux PM brushless motor in a single load configuration in accordance with an embodiment.

FIG. 2 depicts an actuator assembly 100 in accordance with an embodiment. The actuator assembly 100 includes the motor assembly shown generally as 10 as described with respect to FIG. 1 mounted in an actuator outer housing 19. A load 27 (e.g., flaps, slats, spoilers, to be actuated etc.) on the left mount 24a, while the right mount 24b is anchored to a fixed frame 26 (e.g., of the airframe). Outer housing frame 19 is free to slide in the axial direction (e.g., left-to-right) along slider 30 to provide "jam-tolerant" operation as depicted by the arrow inside slider 30. Slider 30 is operably connected to a fixed frame 26, (e.g., airframe), and the like. In an embodiment, the slider 30 facilitates motion of the housing frame 19 in the axial direction while preventing other translational motion (i.e., up-and-down, in-out of the plane of the paper) and rotational motion (i.e., about the axial axis of the actuator assembly 100). In one embodiment, rotor assembly shown generally as 9a, and shaft 14a are held in a fixed position (not rotating) mid-stroke via nut and clevis 23a and it provides full actuation capability of load 27 in extend/retract position. That is, left rotor assembly 9a is held fixed, while the right rotor assembly shown generally as 9b is commanded to rotate. The rotation of screw mechanism 22b causes nut and clevis 23b to push against mount 24b at fixed frame 26 causing the entire actuator assembly 100 to move inside/within the slider 30 actuating the load 27 connected to mount 24a. In an unlikely case when rotor assembly 9b and shaft 14b and screw mechanism 22b or nut and clevis 23b cease to move, rotor assembly 9a can then be commanded to rotate instead causing screw mechanism 22a to push the nut and clevis 23a and thereby actuate the load 27.

Conversely, with respect to FIG. 2 as well, in another embodiment, rotor assembly 9b and shaft 14b are held in a fixed position (not rotating) mid-stroke (or any position) via nut and clevis 23a and it provides full actuation capability of load 27 in extend/retract position. That is, right rotor assembly 9b is held fixed, while the left rotor assembly 9a is commanded to rotate rotor shaft 14a. In this embodiment, the actuator housing 19 remains substantially fixed on the slider 30 as the rotor assembly 9a pushes against the fixed rotor assembly 9b on the right side of the actuator assembly 100. The rotation of screw mechanism 22a causes nut and clevis 23a to push against the fixed right mount 24b and actuate the load 27. Once again, in this case, should the rotor assembly 9a and screw mechanism 22a or nut and clevis 23a cease to move, rotor assembly 9b can then be commanded to rotate instead causing screw mechanism 22b to push the nut and clevis 23a and thereby actuate the load at 27.

Continuing with FIG. 2, in addition to the motor assembly 10, the actuator assembly 100 includes two reduction gears sets 20a and 20b. In an embodiment the reduction gear sets 20a, 20b have an input and an output that are concentric. Moreover, in another embodiment the reduction gear set 20a is a planetary gear set. The reduction gear set 20a operably attached at its input to the left rotor assembly 9a and rotary shaft 14a. Furthermore, the reduction gear set 20b is planetary gear set. The reduction gear set 20b is operably attached at its input to the right rotor assembly 9b and rotary shaft 14b. The output of the reduction gear set 20a is operably connected to output shaft 21a, while the output of reduction gear set 20b is operably connected to output shaft 21b. Reduction gear sets e.g., 20a, 20b reduce the speeds provided by the output shafts 14a, 14b of the motor assembly 10 as directed to the output shafts 21a and 21b because the speed of motor assembly 10 should be reasonably high to ensure desirable operational characteristics (e.g., efficiency, and, as a result, lower weight and size than low- or medium-speed motors) for the actuator assembly 100. High-speed electric motors exhibit better performance, especially in efficiency, and lower weight and size than low- or medium-speed motors. It is, therefore, preferred to operate the proposed electric motor assembly 10 at its optimum highest rotational speed.

Continuing with FIG. 2, the actuator assembly 100 also includes two screw mechanisms 22a and 22b. Screw mechanism 22a is operably attached to gear set 20a on the left of the actuator assembly 100, while screw mechanism 22b is operably attached to gear set 20b on the right of the actuator assembly 100. The screw mechanisms 22a, 22b can be a standard screw, ball-screw, or roller screw mechanism. The two screw mechanisms 22a and 22b convert the rotary motion of the two output shafts 21a, 21b (for the left and right sides of the actuator assembly 100 respectively) into linear motion. The actuator assembly 100 can be implemented in two different jam-tolerant configurations. Output shaft 21a (left) and output shaft 21b (right) are independent and can spin on bearings 25, with the same speed or different speeds, either in the same, or in opposite directions within the actuator assembly 100.

Figure 3:
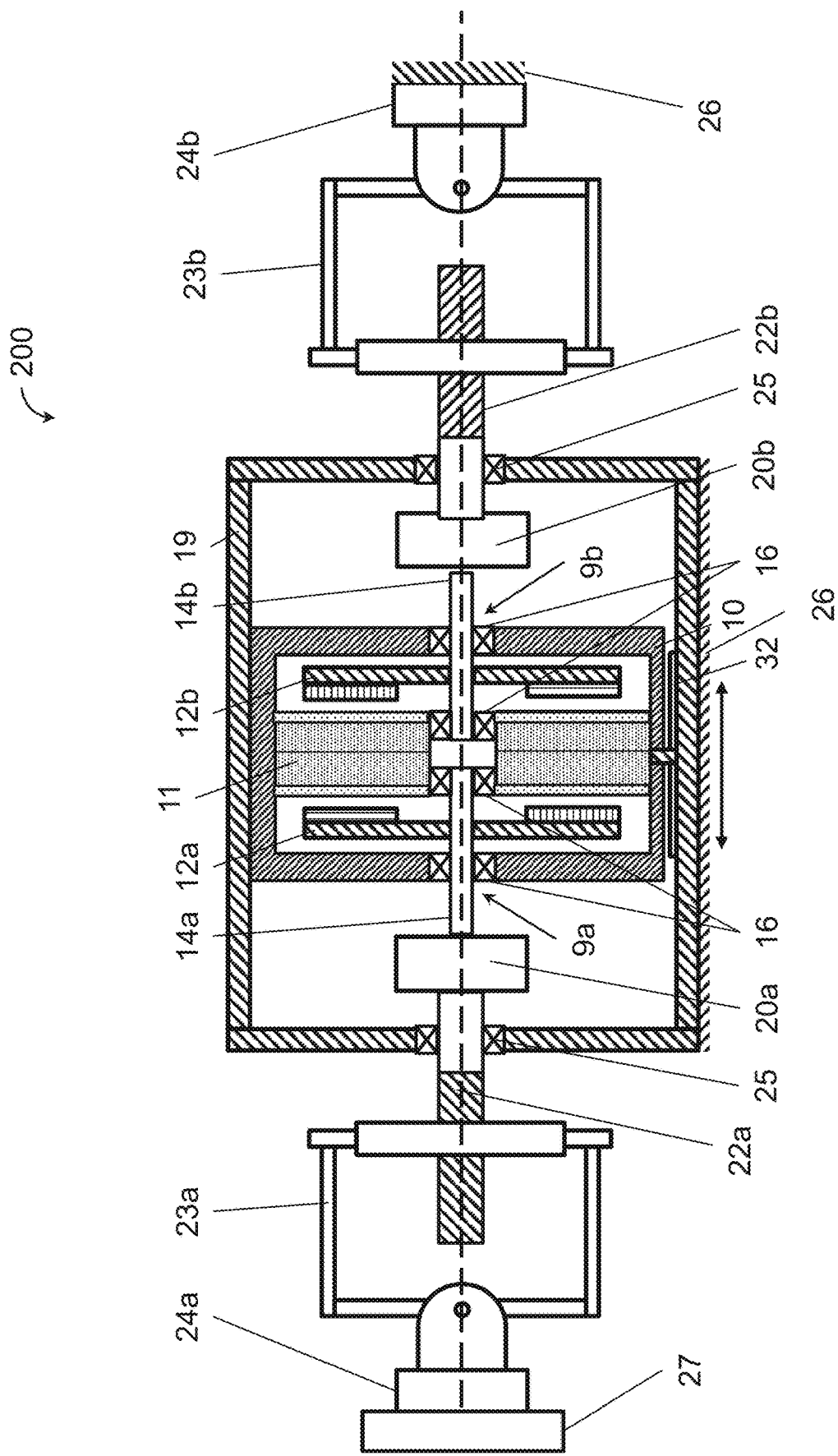
FIG. 3 depicts another simplified schematic of an electromagnetic linear actuator with contra-rotating axial-flux PM brushless motor in a single load configuration in accordance with an embodiment.

FIG. 3 depicts another embodiment of the actuator assembly, in this instance denoted as reference numeral 200. In this embodiment, each of the components of the actuator assembly 200 are the same as the actuator assembly 100 except as specifically noted. In this embodiment, the actuator assembly 200 includes the motor assembly 10 with rotor assemblies 9a and 9b, each operably connected respectively to gear mechanisms 20a and 20b as well as screw mechanisms 22a and 22b as described with respect to FIG. 2. However, in this embodiment, the motor assembly 10 is slidingly mounted in actuator outer housing 19 to be movable axially (left-to-right) within the housing as indicated by the arrow below slider 32. Once again, there is a load 27 (e.g., flaps, slats, spoilers, etc.) to be actuated on the left mount 24a, while the right mount 24b is anchored to a fixed frame 26 (e.g., of the airframe). In one embodiment, outer housing frame 19 is fixed to airframe while the motor assembly 10 is free to slide axially (left-to-right) along slider 32 to provide "jam-tolerant" operation. Slider 32 is anchored to and within the actuator housing 19. In one embodiment, rotor assembly 9a is held in a fixed position (not rotating) mid-stroke via nut and clevis 23a and it provides full actuation capability of load 27 in extend/retract position. That is, left rotor assembly 9a is held fixed, while the right rotor assembly 9b is commanded to rotate. The rotation of screw mechanism 22b causes nut and clevis 23b to push against mount 24b and fixed frame 26 causing the entire motor assembly 10 to slide in the slot of slider 32 actuating the load 27. In an unlikely case when rotor assembly 9b and shaft 14b and screw mechanism 22b or nut and clevis 23b cease to move, rotor assembly 9a can then be commanded to rotate instead causing screw mechanism 22a to push the nut and clevis 23b against the mount 24b connected to fixed frame 26, and thereby actuate the load 27.

Conversely, in another embodiment, rotor assembly 9b is held in a fixed position (not rotating) mid-stroke (or any position) via nut and clevis 23b and it provides full actuation capability of load 27 in extend/retract position. That is, right rotor assembly 9b is held fixed, while the left rotor assembly 9a is commanded to rotate. In this embodiment, the motor assembly 10 remains substantially fixed in slide 32 as the rotor assembly 9a pushes against the fixed rotor assembly 9b on the right side of that actuator assembly 200. The rotation of screw mechanism 22a causes nut and clevis 23a to push against the fixed right side and actuate the load 27. Once again, in this case, should the rotor assembly 9a and shaft 14a and screw mechanism 22a or nut and clevis 23a cease to move, rotor assembly 9b can then be commanded to rotate instead causing screw mechanism 22b to push the nut and clevis 23b and thereby actuate the load 27.

Figure 4:
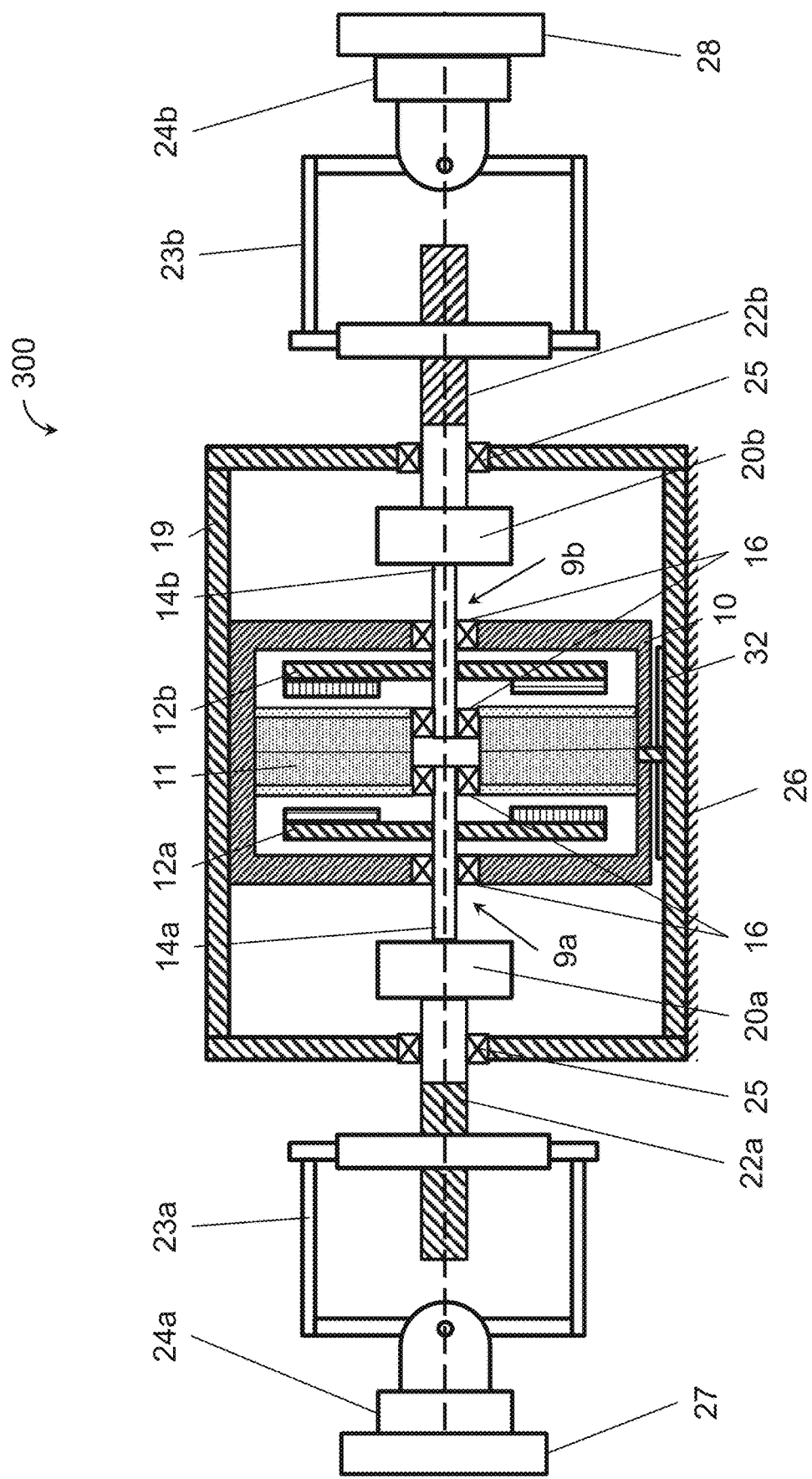
FIG. 4 depicts a simplified schematic of an electromagnetic linear actuator with contra-rotating axial-flux PM brushless motor in a dual load configuration in accordance with an embodiment.

FIG. 4 depicts another embodiment of the actuator assembly, in this instance denoted as reference numeral 300. In this embodiment each of the components of the actuator assembly 300 are the same as the actuator assembly 200 except as specifically noted. In this embodiment, the actuator assembly 300 may be configured for drive dual loads or actuation points. In this embodiment the actuator assembly 300, once again includes the motor assembly 10 as described with respect to FIG. 1 is slidingly mounted in an actuator outer housing 19 and the actuator outer housing 19 is fixed as described herein. A load, 27, is applied on the left mount 24a. A second load, 28, is applied on the right mount at 24b. The actuator outer housing 19 of the actuator assembly 300 is fixed (e.g. to airframe) while the motor assembly 10 is free to slide axially (left-to-right) along slider 32 to provide "jam-tolerant" operation. Slider 32 is operably attached to the actuator outer housing 19 (which, in turn, is anchored, for example to airframe). In one embodiment, rotor assembly 9a is free to actuate (rotate) via nut and clevis 23a and it provides full actuation capability of load 27 in extend/retract position. Likewise, rotor assembly 9b is free to actuate (rotate) via nut and clevis 23b through mount 24b and it provides full actuation capability of load 28 in extend/retract position connected to the mount 24b. Furthermore, it should be appreciated that load 27 and load 28 may be different loads and types of loads.

It should be appreciated that any embodiment is generally described first with respect to rotor assembly 9a being fixed and rotor assembly 9b being commanded to rotate, and then conversely for the jam tolerant case rotor assembly 9b being commanded to rotate while rotor assembly 9a is not rotating, such order is merely for illustration. Either or both rotor assemblies 9a and 9b can be initially commanded to rotate.

The terms "about" and "substantially" are intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A jam-tolerant electromechanical linear actuator, the actuator comprising
    an axial flux permanent magnet (PM) motor having a motor housing and a multipole stator assembly fixed in the motor housing, the motor also including a first rotor assembly and a second rotor assembly, the first rotor assembly having a first rotating shaft and the second rotor assembly having a second rotating shaft, the first rotating shaft and the second rotating shaft radially and axially fixed by bearings in the motor housing;
    a first speed reduction mechanism having a first input and a first output and a second speed reduction mechanism having a second input and a second output, the first speed reduction mechanism operably coupled to the first rotor shaft and the second speed reduction mechanism operable coupled to the second rotor shaft;
    a first output shaft and a second output shaft, the first output shaft operably coupled to the output of the first speed reduction mechanism and the second output shaft operably coupled to the output of the second speed reduction mechanism;
    a housing enclosing the PM motor, first speed reduction mechanism and second speed reduction mechanism, the housing including a first bearing to support the first output shaft at least radially, and a second bearing to support the second output shaft at least radially; and
    a slide mechanism operably coupled to the housing, the slide mechanism configured to at least one of permit the housing to slide in an axial direction when the motor housing is fixed to the housing and permit the motor housing to slide in a axial direction with respect to the housing when the housing is held fixed.

2. The jam tolerant electromechanical linear actuator of claim 1, further including the first output shaft and a second output shaft, radially and axially fixed by bearings in the housing.

3. The jam-tolerant electromechanical linear actuator of claim 1, further including a first screw mechanism operably connected to the first output shaft and a second screw mechanism operably connected to the second output shaft.

4. The jam-tolerant electromechanical linear actuator of claim 3, wherein the least one of the first screw mechanism or the second screw mechanism comprises at least one of a jack screw, a ball screw, and a roller screw.

5. The jam-tolerant electromechanical linear actuator of claim 3, further including a first nut and first clevis and a second nut and second clevis, the first nut and first clevis operably connected to the first screw mechanism and the second nut and second clevis operably connected to the second screw mechanism.

6. The jam-tolerant electromechanical linear actuator of claim 5, wherein at least one of the housing, and at least one of the first nut and first clevis and the second nut and second clevis are fixed and the other of the at least one of the first nut and first clevis and the second nut and second clevis are operably connected to a load.

7. The jam-tolerant electromechanical linear actuator of claim 5, wherein at the first nut and first screw mechanism and the second nut and second screw mechanism at least one of, are concentric, rotate at different speeds, and rotate in opposite directions.

8. The jam-tolerant electromechanical linear actuator of claim 1, wherein at least one of the housing, and at least one of the first output shaft and the second output shaft are fixed and the other of the at least one of the first output shaft and the second output shaft is operably connected to a load.

9. The jam-tolerant electromechanical linear actuator of claim 1, wherein at least two of the first rotor assembly, second rotor assembly first output shaft, second output shaft, first speed reduction mechanism and second speed reduction mechanism are at least one of, are concentric, rotate at different speeds, and rotate.

10. The jam-tolerant electromechanical linear actuator of claim 1 wherein the slide mechanism is fixed to frame and operably coupled to the housing when the motor housing is fixed to the housing and the slide mechanism fixed to the housing when the and the motor housing when the motor housing is not fixed to the housing.

11. The jam-tolerant electromechanical linear actuator of claim 10, wherein the slide mechanism is configured to permit movement axially but not rotationally.

12. The jam-tolerant electromechanical linear actuator of claim 1, wherein the stator assembly comprises a ferromagnetic stator core and a plurality of polyphase stator windings.

13. The jam-tolerant electromechanical linear actuator of claim 1, wherein the ferromagnetic stator core is common to each winding of the plurality of polyphase stator windings.

14. The jam-tolerant electromechanical linear actuator of claim 1, wherein each of the first rotor assembly and second rotor assembly further comprises a disk-shaped ferromagnetic rotor core having a side proximal to the stator assembly and a side distal from the stator assembly, each rotor core having a plurality of PMs disposed circumferentially about an outer periphery on the proximal side.

15. The jam-tolerant electromechanical linear actuator of claim 14, wherein the ferromagnetic rotor core comprises at least one of a laminated ferromagnetic alloy construction, a sintered magnetic powder construction, a solid steel structure, and a ferromagnetic stamping.

16. The jam-tolerant electromechanical linear actuator of claim 14, wherein the permanent magnets at least one of rectangular and trapezoidal and arcuate segments having two longer sides arranged substantially radially on the rotor core.

17. The jam-tolerant electromechanical linear actuator of claim 1, wherein the first input and a first output of the first speed reduction mechanism and the second input and a second output, a second speed reduction mechanism having the first speed reduction mechanism operably coupled to the first rotor shaft and the second speed reduction mechanism operable coupled to the second rotor shaft.

18. The jam-tolerant electromechanical linear actuator of claim 17, wherein the first speed reduction mechanism and the second speed reduction mechanism are each planetary gear sets.

19. A jam-tolerant electromechanical linear actuator, the actuator comprising
    an axial flux permanent magnet (PM) motor having a motor housing and a multipole stator assembly fixed in the motor housing, the motor also including a first rotor assembly and a second rotor assembly, the first rotor assembly having a first rotating shaft and the second rotor assembly having a second rotating shaft, the first rotating shaft and the second rotating shaft radially and axially fixed by bearings in the motor housing;

a first speed reduction mechanism having a first input and a first output and a second speed reduction mechanism having a second input and a second output, the first speed reduction mechanism operably coupled to the first rotor shaft and the second speed reduction mechanism operable coupled to the second rotor shaft;

a first output shaft and a second output shaft, the first output shaft operably coupled to the output of the first speed reduction mechanism and the second output shaft operably coupled to the output of the second speed reduction mechanism;

a first screw mechanism operably connected to the first output shaft and a second screw mechanism operably connected to the second output shaft;

a first nut and first clevis and a second nut and second clevis, the first nut and first clevis operably connected to the first screw mechanism and the second nut and second clevis operably connected to the second screw mechanism;

a housing, enclosing the PM motor, first speed reduction mechanism and second speed reduction mechanism, the housing including a first bearing to support the first output shaft at least radially, and a second bearing to support the second output shaft at least radially and axially; and a slide mechanism operably coupled to the housing, the slide mechanism configured to at least one of permit the housing to slide in an axial direction when the motor housing is fixed to the housing and permit the motor housing to slide in a axial direction with respect to the housing when the housing is held fixed, wherein at least one of the housing, and at least one of the first nut and first clevis and the second nut and second clevis are fixed and the other of the at least one of the first nut and first clevis and the second nut and second clevis is operably connected to a load.

* * * * *